US012657404B2

(12) United States Patent
Wang et al.

(10) Patent No.: US 12,657,404 B2
(45) Date of Patent: Jun. 16, 2026

(54) EFFICIENT AND EFFECTIVE SYSTEM AND METHOD TO BUILD MULTI-LINGUAL LARGE LANGUAGE MODELS

(71) Applicant: Samsung Electronics Co., Ltd., Suwon-si (KR)

(72) Inventors: Hai Wang, Santa Clara, CA (US); Zheng Tang, Mountain View, CA (US); Vijay Srinivasan, San Jose, CA (US); Hyuk Joon Kwon, New York, NY (US); Vikas Yadav, San Jose, CA (US); Feixuan Wang, Mountain View, CA (US); Hongxia Jin, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 179 days.

(21) Appl. No.: 18/401,100

(22) Filed: Dec. 29, 2023

(65) Prior Publication Data

US 2025/0217604 A1 Jul. 3, 2025

(51) Int. Cl.
*G06F 40/55* (2020.01)
*G06F 40/284* (2020.01)

(52) U.S. Cl.
CPC ............ *G06F 40/55* (2020.01); *G06F 40/284* (2020.01)

(58) Field of Classification Search
CPC ............................... G06F 40/55; G06F 40/284
See application file for complete search history.

(56) References Cited

U.S. PATENT DOCUMENTS

| | | |
|---|---|---|
| 2022/0019743 A1 | 1/2022 | Ouyang et al. |
| 2023/0104662 A1 | 4/2023 | Fatemi et al. |
| 2023/0153543 A1 | 5/2023 | Zhang et al. |
| 2024/0256965 A1* | 8/2024 | Chung ................... G06N 20/00 |
| 2025/0131915 A1* | 4/2025 | Xie .......................... G10L 15/01 |
| 2025/0173522 A1* | 5/2025 | Chen ..................... G06F 40/242 |

FOREIGN PATENT DOCUMENTS

| | | |
|---|---|---|
| CN | 115730612 A | 3/2023 |
| CN | 116244416 A | 6/2023 |

OTHER PUBLICATIONS

Csaki, et al., Efficiently adapting pretrained language models to new languages, arXiv:2311.05741, 2023 (Year: 2023).*

(Continued)

*Primary Examiner* — Bhavesh M Mehta
*Assistant Examiner* — Eunice Lee

(57) ABSTRACT

A method of enabling a language model trained in a first language to support a second language includes extending an existing vocabulary of the language model to include additional tokens for text in the second language. The method also includes initializing the additional tokens for text in the second language based on subtokens of tokens for text in the first language from the existing vocabulary. The method further includes training the language model using a mixed language dataset that includes a first language corpus and a second language corpus. In addition, the method includes performing instruction tuning using a dataset that includes (i) instruction and response pairs involving the first language and (ii) instruction and response pairs involving the second language.

20 Claims, 6 Drawing Sheets

(56) References Cited

OTHER PUBLICATIONS

Cahyawijaya et al., InstructAlign: High-and-low resource language alignment via continual crosslingual instruction tuning, arXiv:2305.13627, 2023 (Year: 2023).*

Imani et al., Scaling multilingual corpora and language models to 500 languages, arXiv:2305.12182v2, 2023 (Year: 2023).*

Liu et al., Multilingual denoising pre-training for neural machine translation, Transactions of the Association for Computational Linguistics, Aug. 2020 (Year: 2020).*

Yong et al., "BLOOM+1: Adding Language Support to BLOOM for Zero-Shot Prompting", arXiv:2212.09535v3 [cs.CL], May 2023, 20 pages.

Cui et al., "Efficient and Effective Text Encoding for Chinese LLaMA and Alpaca", arXiv:2304.08177v2 [cs.CL], Jun. 2023, 18 pages.

Beomi et al., "KoAlpaca: An open source language model that understands Korean commands", Github, KoAlpaca, Mar. 2023, 40 pages.

Yang et al., "BigTranslate: Augmenting Large Language Models with Multilingual Translation Capability over 100 Languages", arXiv:2305.18098v2 [cs.CL], Jul. 2023, 13 pages.

Chen et al., "Phoenix: Democratizing ChatGPT across Languages", arXiv:2304.10453v1 [cs.CL], Apr. 2023, 19 pages.

Shliazhko et al., "mGPT: Few-Shot Learners Go Multilingual", arXiv:2204.07580v2 [cs.CL], Oct. 2023, 21 pages.

Lin et al., "Few-shot Learning with Multilingual Generative Language Models", arXiv:2112.10668v3 [cs.CL], Nov. 2022, 34 pages.

Xue et al., "mT5: A Massively Multilingual Pre-trained Text-to-Text Transformer", arXiv:2010.11934v3 [cs.CL], Mar. 2021, 17 pages.

Cahyawijaya et al., "InstructAlign: High-and-Low Resource Language Alignment via Continual Crosslingual Instruction Training", arXiv:2305.13627v2 [cs.CL], Oct. 2023, 24 pages.

* cited by examiner

\_,0xEC, 0x9C, 0xA4, 0xEC, 0x84, 0x9D, 0xEC, 0x97, 0xB4, \_,대 .
0xED, 0x86, 0xB5, 0xEB, 0xA0, 0xB9, 이 . \_,1, 2

\_윤 . 석 , 열 , \_대 통 령 이 . \_12

EFFICIENT AND EFFECTIVE SYSTEM AND METHOD TO BUILD MULTI-LINGUAL LARGE LANGUAGE MODELS

TECHNICAL FIELD

This disclosure relates generally to large language models. More specifically, this disclosure relates to an efficient and effective system and method to build multi-lingual large language models.

BACKGROUND

Large language models (LLMs) have achieved remarkable success for various natural language processing (NLP) tasks, such as text summarization, question answering, language understanding, math reasoning, and coding generation. Due to their surprising zero-shot and few-shot performance in various downstream NLP tasks, large language models have drawn significant attention from the artificial intelligence (AI) community and offered a potential path towards artificial general intelligence (AGI).

SUMMARY

This disclosure relates to an efficient and effective system and method to build multi-lingual large language models.

In a first embodiment, a method of enabling a language model trained in a first language to support a second language includes extending an existing vocabulary of the language model to include additional tokens for text in the second language. The method also includes initializing the additional tokens for text in the second language based on subtokens of tokens for text in the first language from the existing vocabulary. The method further includes training the language model using a mixed language dataset that includes a first language corpus and a second language corpus. In addition, the method includes performing instruction tuning using a dataset that includes (i) instruction and response pairs involving the first language and (ii) instruction and response pairs involving the second language.

In a second embodiment, an electronic device includes at least one processing device configured to extend an existing vocabulary of a language model trained in a first language to include additional tokens for text in a second language. The at least one processing device is also configured to initialize the additional tokens for text in the second language based on subtokens of tokens for text in the first language from the existing vocabulary. The at least one processing device is further configured to train the language model using a mixed language dataset that includes a first language corpus and a second language corpus. In addition, the at least one processing device is configured to perform instruction tuning using a dataset that includes (i) instruction and response pairs involving the first language and (ii) instruction and response pairs involving the second language.

In a third embodiment, a non-transitory machine readable medium contains instructions that when executed cause at least one processor of an electronic device to extend an existing vocabulary of a language model trained in a first language to include additional tokens for text in a second language. The non-transitory machine readable medium also contains instructions that when executed cause the at least one processor to initialize the additional tokens for text in the second language based on subtokens of tokens for text in the first language from the existing vocabulary. The non-transitory machine readable medium further contains instructions that when executed cause the at least one processor to train the language model using a mixed language dataset that includes a first language corpus and a second language corpus. In addition, the non-transitory machine readable medium contains instructions that when executed cause the at least one processor to perform instruction tuning using a dataset that includes (i) instruction and response pairs involving the first language and (ii) instruction and response pairs involving the second language.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a dryer, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
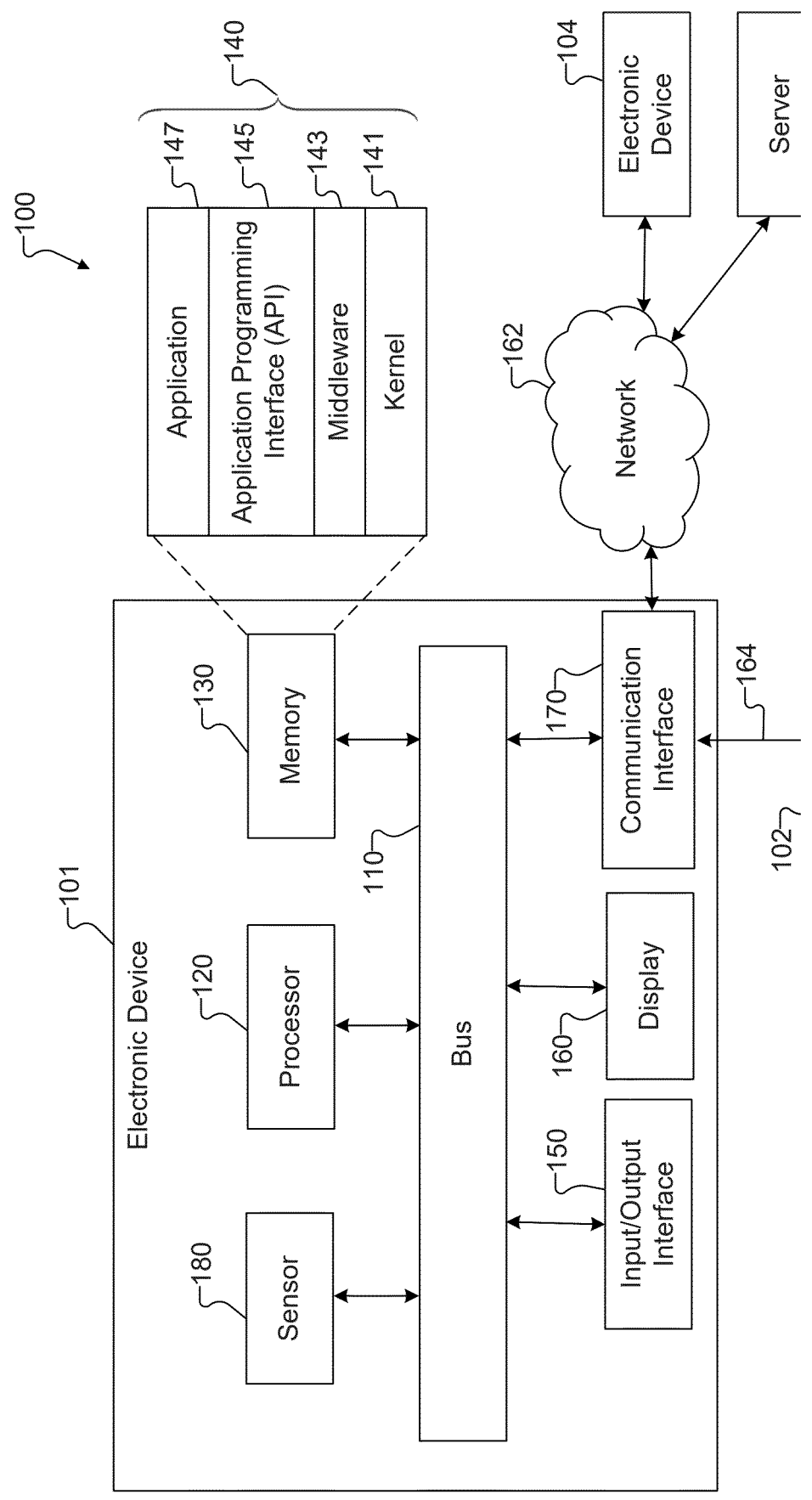
FIG. 1 illustrates an example network configuration including an electronic device in accordance with this disclosure.

FIGS. 1 through 5, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, large language models (LLMs) have achieved remarkable success for various natural language processing (NLP) tasks, such as text summarization, question answering, language understanding, math reasoning, and coding generation. Due to their surprising zero-shot and few-shot performance in various downstream NLP tasks, large language models have drawn significant attention from the artificial intelligence (AI) community and offered a potential path towards artificial general intelligence (AGI).

Various problems can arise when attempting to build multi-lingual LLMs. Currently, the most widely-used technique is pre-training from scratch on a very large multilingual corpus (such as about 5,000 gigabytes text data). Unfortunately, pre-training multi-lingual LLMs is quite expensive. For example, pre-training a decent LLaMA model with seven billion parameters currently costs several millions of dollars, requires thousands of computing cores, and takes around one month to complete the entire training process (which does not consider finding optimal hyperparameters to train).

This disclosure provides various techniques for building multi-lingual LLMs. Instead of pre-training multi-lingual models from scratch, the described techniques provide a more efficient mechanism to build an LLM utilizing an existing pre-trained model and extending the model to new languages. In some cases, the inputs for such a system could be a plain text corpus for a new language X plus English, instruction tuning data for the new language X plus English, and a well pre-trained English-language LLM (where X can be any new language), and the output from such a system could include an LLM for both English and the new language X. Note, however, that there is no requirement that the plain text corpus include English text or that the original LLM represent an English-based LLM. The described techniques overcome various technical challenges with extending LLMs, such as how to efficiently encode the new language X given the original English or other LLM, how to transfer knowledge in the original English or other LLM to the new language X and align the knowledge between those two languages, and how to reduce training costs for this whole procedure and reduce the resulting model's inference latency. Moreover, the described techniques can accomplish this while improving performance for the new language X and while maintaining the model's performance for the original English or other language as much as possible.

In some embodiments, a technique to extend a language model's capabilities to a new language may include one, some, or all of the following features.

Extension of the existing model's vocabulary to include tokens from the new language and initialization of the new tokens' embeddings based on the embeddings of their subtokens in the model's existing vocabulary (such as the average of the embeddings).

After extending the vocabulary and initializing the new token embeddings, continuing to fully pre-training (such as via causal language modeling) the model on a mix of data from the existing language(s) supported by the language model and data from the new language to be added. In some cases, the mix of new language data versus existing language data may be automatically determined to improve performance in the new language without affecting existing language performance (at least to a significant extent).

Further instruction tuning of the continuously pre-trained model based on a mix of data that includes (i) general instruction data from the new language and from the existing language(s) and (ii) instruction data to align the multiple languages, such as machine translation parallel data and conditional denoising data. In some cases, the mix of these different datasets may be automatically determined to improve performance in the new language without affecting existing language performance (at least to a significant extent).

Extension of the model to new languages one by one, which helps optimize data mixtures to improve performance in the new languages without affecting existing language performance (at least to a significant extent).

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more processing devices, such as one or more microprocessors, microcontrollers, digital signal processors (DSPs), application specific integrated circuits (ASICs), or field programmable gate arrays (FPGAs). In some embodiments, the processor 120 includes one or more of a central processing unit (CPU), an application processor (AP), a communication processor (CP), a graphics processor unit (GPU), or a neural processing unit (NPU). The processor 120 is able to perform control on at least one of the other components of the electronic device 101 and/or perform an operation or data processing relating to communication or other functions. As described in more detail below, the processor 120 may perform one or more operations for building and/or using multi-lingual large language models.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may support one or more functions for building and/or using multi-lingual large language models. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals.

The wireless communication is able to use at least one of, for example, WiFi, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, one or more sensors 180 can include one or more cameras or other imaging sensors for capturing images of scenes. The sensor(s) 180 can also include one or more buttons for touch input, one or more microphones, a gesture sensor, a gyroscope or gyro sensor, an air pressure sensor, a magnetic sensor or magnetometer, an acceleration sensor or accelerometer, a grip sensor, a proximity sensor, a color sensor (such as an RGB sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

In some embodiments, the first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that includes one or more imaging sensors.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components 110-180 as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. As described in more detail below, the server 106 may perform one or more operations for building and/or using multi-lingual large language models.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
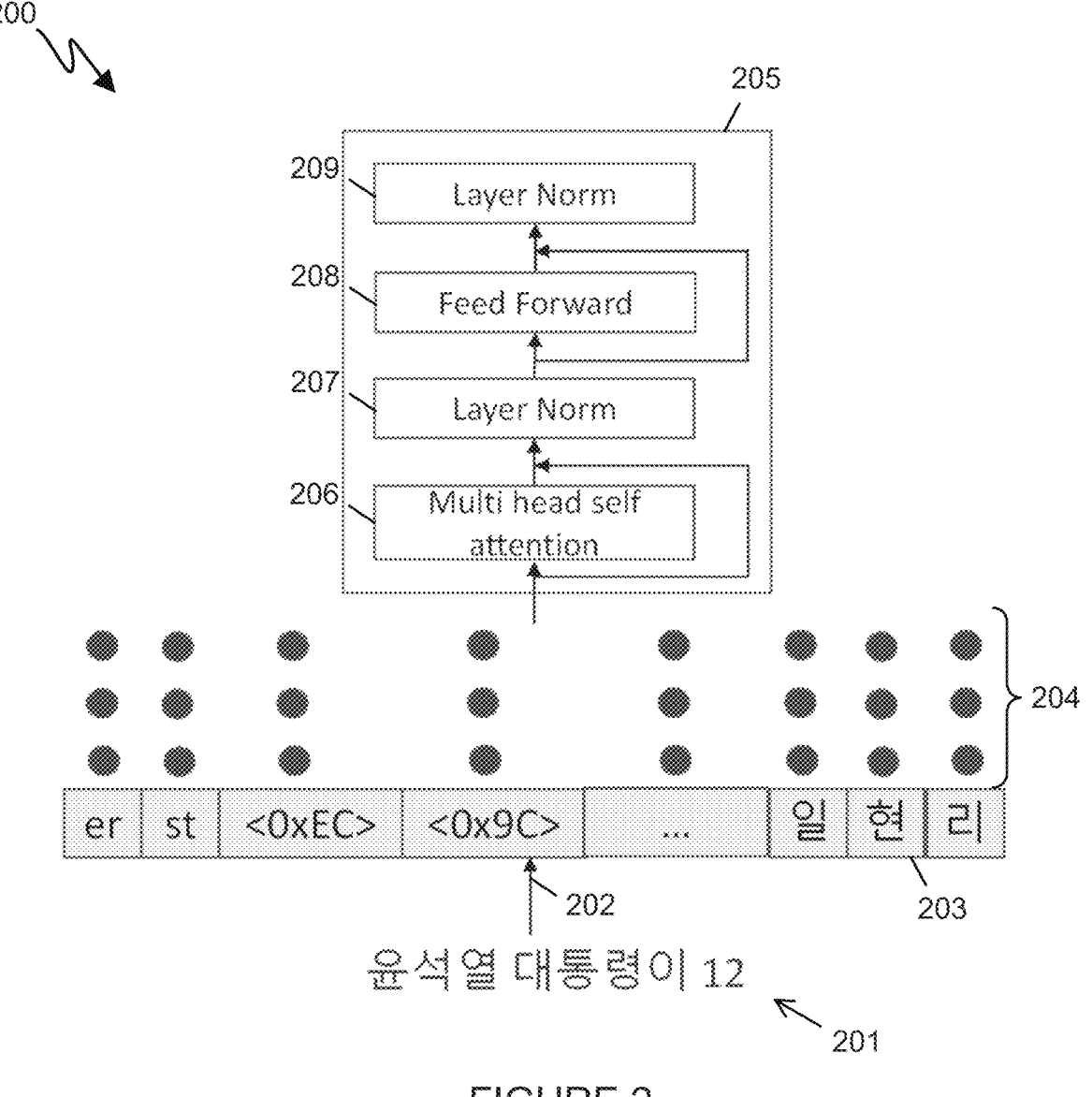
FIG. 2 illustrates an example architecture for a transformer for extension of a large language model (LLM) to new languages in accordance with this disclosure.

FIG. 2 illustrates an example architecture 200 for a transformer for extension of an LLM to new languages in accordance with this disclosure. For ease of explanation, the architecture 200 is described as being implemented using one or more components of the network configuration 100 of FIG. 1 described above, such as one or more servers 106. However, this is merely one example, and the architecture 200 could be implemented using any other suitable device(s) and in any other suitable system(s).

As shown in FIG. 2, an input 201 represents text being used to extend an existing LLM to a new language (used by the input 201) (non-English text in the figures is used for purposes of illustrating the operation of models in accordance with the present disclosure). The input 201 may be obtained from any suitable source and in any suitable manner. The input 201 undergoes tokenization 202, which represents a process in which the input 201 is converted into smaller portions referred to as tokens 203. The tokens 203 are associated with a vocabulary that is used with the input 201, where that vocabulary is being added to the vocabulary recognized by the existing LLM. The tokens 203 are converted into token embeddings 204, which represent semantic embeddings of the tokens 203 within a latent feature space. These token embeddings 204 are passed to a transformer block 205. The transformer block 205 includes a multi-head self-attention layer 206, a first normalization layer 207, a feed forward layer 208, and a second normalization layer 209. The multi-head self-attention layer 206 provides an attention mechanism that is used multiple times in parallel to process the token embeddings 204, where the resulting outputs from the attention mechanism are concatenated and possibly transformed linearly. This effectively allows the multi-head self-attention layer 206 to provide attention to different parts of the input 201 in different ways. Outputs from the multi-head self-attention layer 206 and the original inputs to the multi-head self-attention layer 206 are combined (such as via addition), and the results are normalized by the first normalization layer 207. Common weights are applied to the normalized results associated with all of the tokens 203 by the feed forward layer 208. Outputs from the feed forward layer 208 and the original inputs to the feed forward layer 208 are combined (such as via addition), and the results are normalized by the second normalization layer 209. The outputs from the transformer block 205 represent an encoded version of the original input 201.

The transformer block 205 can be implemented using any suitable transformer-based attention model. As a particular example, the transformer block 205 may be implemented using a transformer-based model described in Vaswani et al., "Attention is All You Need," NIPS'17: Proceedings of the 31st International Conference on Neural Information Processing Systems, December 2017, pages 6000-6010 (which is hereby incorporated by reference in its entirety).

Although FIG. 2 illustrates one example of an architecture 200 for a transformer for extension of an LLM to new languages, various changes may be made to FIG. 2. For example, the transformer block 205 could include additional layers or interconnections in any suitable arrangement. In general, large language model transformers come in a wide variety of configurations, and FIG. 2 does not limit the scope of this disclosure to any particular configuration.

Figure 3:
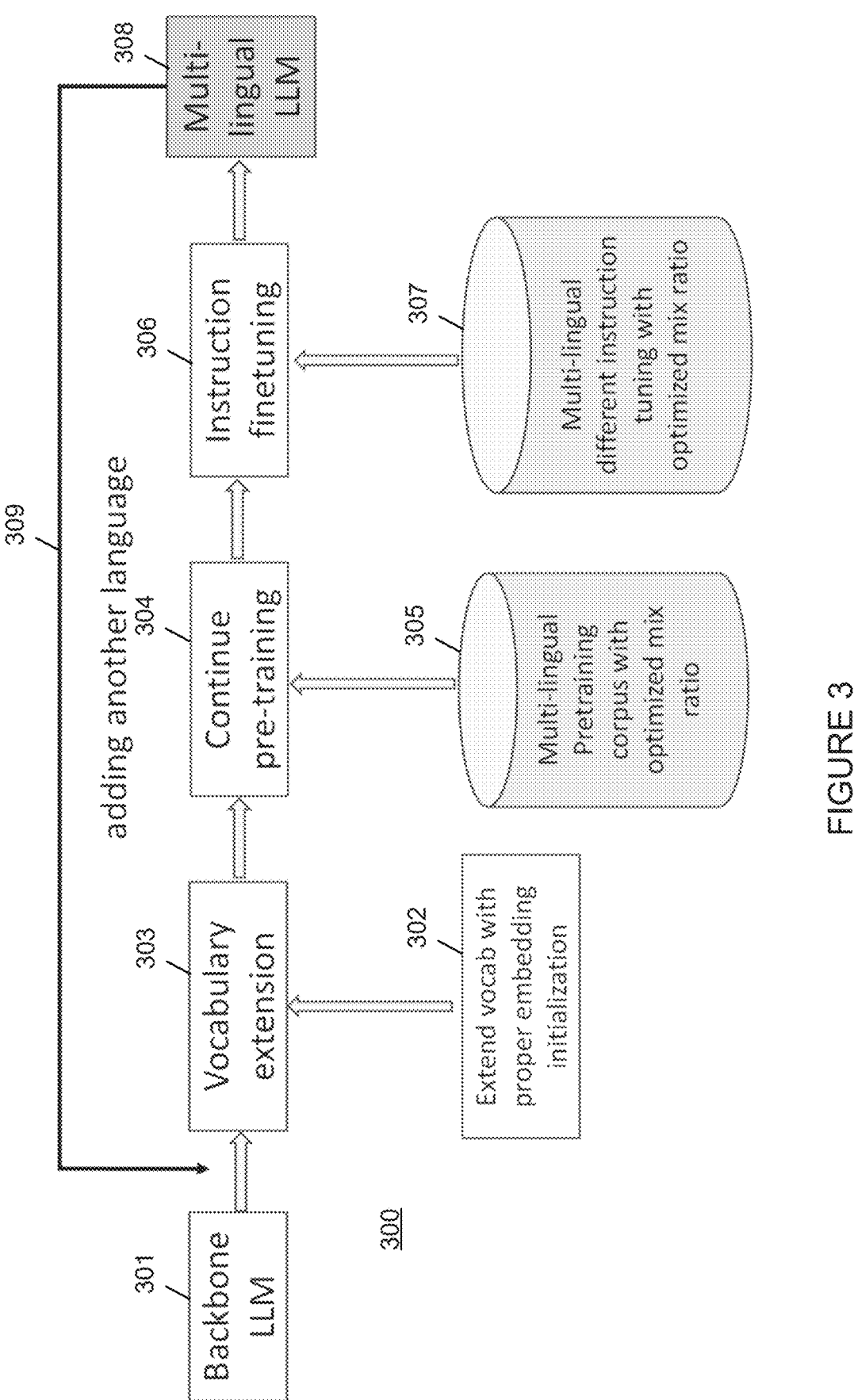
FIG. 3 illustrates an example pipeline for adding another language during extension of an LLM to new languages in accordance with this disclosure.

FIG. 3 illustrates an example pipeline 300 for adding another language during extension of an LLM to new languages in accordance with this disclosure. For ease of explanation, the pipeline 300 is described as being implemented using one or more components of the network configuration 100 of FIG. 1 described above, such as one or more servers 106. However, this is merely one example, and the pipeline 300 could be implemented using any other suitable device(s) and in any other suitable system(s).

As shown in FIG. 3, the pipeline 300 includes an existing or "backbone" LLM 301 associated with a first language, such as English. The LLM 301 can have any suitable machine learning-based architecture now known or later developed. The LLM 301 can be trained to originally understand a vocabulary of the first language, such as when a tokenizer is trained to convert inputs 201 into suitable tokens 203 for the first language. Here, the tokenizer can be trained to tokenize text (an input 201) into a sequence of pre-defined subtokens and convert the subtokens into tokens (such as token identifiers).

The LLM 301 and an extended vocabulary 302 are provided to a vocabulary extension function 303. The extended vocabulary 302 is associated with a second language, such as Korean or Chinese. The vocabulary extension function 303 can use the extended vocabulary 302 to expand the vocabulary recognized by the tokenizer of the LLM 301, meaning the tokenizer can learn how to tokenize inputs 201 in the second language into tokens 203 (which are used to generate token embeddings 204 for the second language). As described below, the vocabulary extension function 303 can expand the tokenizer while initializing the new tokens 203, such as when the new tokens 203 are initialized based on subtokens of tokens 203 in the first language (meaning the subtokens are already known by the tokenizer).

A continued pre-training function 304 is performed using the LLM 301 as expanded with the extended vocabulary 302. The continued pre-training function 304 also uses a multi-lingual pretraining corpus 305, which represents a mixed language dataset that includes a first language corpus and a second language corpus. The LLM 301 as expanded with the extended vocabulary 302 is trained here to understand both texts in the first language and texts in the second language. In some cases, the multi-lingual pretraining corpus 305 can include an optimized mix ratio of the first language and the second language, which can help to improve accuracy of the LLM 301 in both the first language and the second language.

An instruction fine-tuning function 306 operates on the modified LLM produced by the continued pre-training function 304 in order to fine-tune operation of the modified LLM. The instruction fine-tuning function 306 also uses a multi-lingual different instruction tuning set 307, which may include a combination of (i) instruction and response pairs involving the first language and (ii) instruction and response pairs involving the second language. The modified LLM is tuned here to generate the specific responses based on the instructions in the tuning set 307 for both languages. In some embodiments, the tuning set 307 may include (i) general instruction data from the first language and the second language and (ii) additional instruction data to align the first language and the second language, where the additional instruction data includes machine translation parallel data and conditional denoising data. In some cases, a mix of the general instruction data and the additional instruction data can be selected to improve performance of the language model in the second language without degrading performance of the language model in the first language.

The result of the fine-tuning is a multi-lingual LLM 308, which can be used to process inputs 201 in both languages. If needed or desired, the multi-lingual LLM 308 can be used as feedback 309 for use as a pipeline input in lieu of the LLM 301, and the multi-lingual LLM 308 can be expanded to a third language in the same manner as described above in order to produce a three-language multi-lingual LLM 308. This process can be repeated any suitable number of times to expand the LLM to any suitable number of languages sequentially.

Although FIG. 3 illustrates one example of a pipeline 300 for adding another language during extension of an LLM to new languages, various changes may be made to FIG. 3. For example, various components or functions in FIG. 3 may be combined, further subdivided, replicated, or rearranged according to particular needs. Also, one or more additional components and functions may be included if needed or desired.

FIGS. 4A through 4D illustrate an example expansion of an existing LLM's vocabulary during extension of the LLM 301 to new languages using the pipeline 300 of FIG. 3 in accordance with this disclosure. More specifically, FIGS. 4A through 4D relate to using an extended vocabulary 302 with the vocabulary extension function 303 to extend the vocabulary of the LLM 301. In this particular example, FIGS. 4A through 4D use the Korean language as the second language, although the same or similar approach may be used with other languages.

Figure 4A:
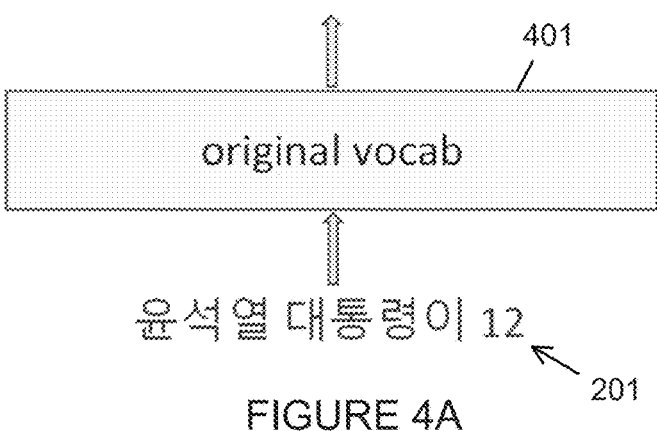
FIGS. 4A through 4D illustrate an example expansion of an existing LLM's vocabulary during extension of the LLM to new languages using the pipeline of FIG. 3 in accordance with this disclosure.
Figure 4B:
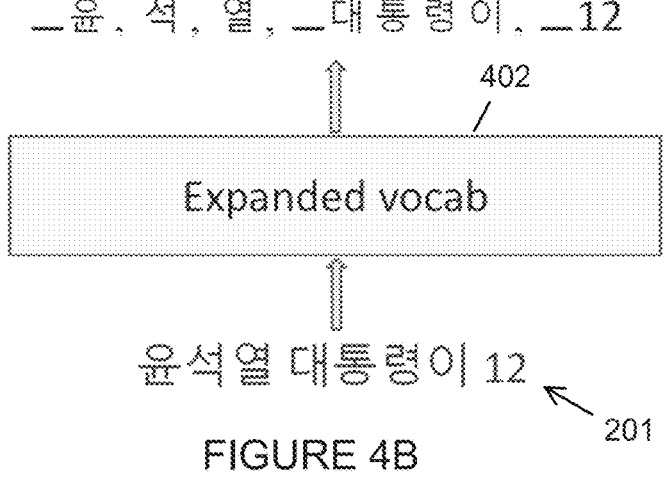

As shown in FIG. 4A, tokenization of an input 201 is shown as occurring before vocabulary extension. During tokenization with an original vocabulary 401 of the original LLM 301, the encoded sequence can be long and contain many semantic-less tokens (even for a relatively simple input). In contrast, as shown in FIG. 4B, tokenization of the same input 201 is shown as occurring after vocabulary extension using the expanded vocabulary 402. With the new vocabulary, the encoded sequence is more specific to the additional language. This is better semantic embedding is learned, and latency can be reduced when generating the extended multi-lingual LLM 308.

Figure 4C:
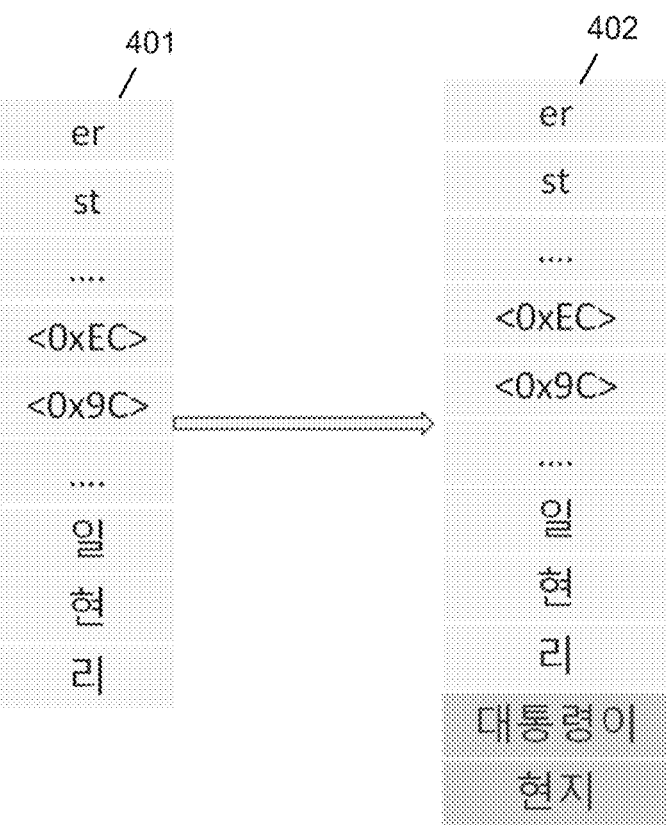

As shown in FIG. 4C, an example of how the vocabulary of a pre-trained LLM can be expanded by adding more target language tokens is shown. Here, the tokenizer has a vocabulary and will tokenize any text into a sequence of pre-defined subtokens, converting the subtokens to token identifiers. By expanding the vocabulary, the tokenizer can learn additional tokens.

Figure 4D:
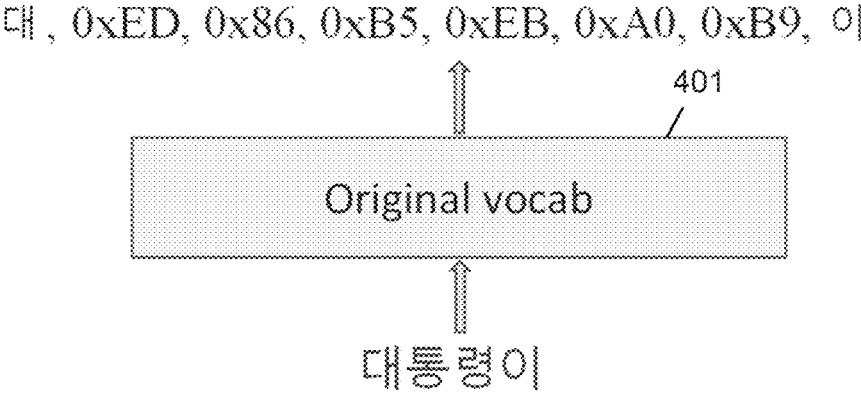

As shown in FIG. 4D, a new token's embedding is being initialized. After expanding the vocabulary, the new token's embedding can be properly initialized with the embedding of its subtokens. This can be done in any suitable manner, such as by using averaging, element-wise maximum/minimum, etc. The example in FIG. 4D uses averaging to initialize the embedding for a newly added token "대통령이," which is done using the following equation.

$$e(\text{대통령이}) = (e(\text{대}) + e(0 \times ED) + e(0 \times 86) +$$
$$e(0 \times B5) + e(0 \times EB) + e(0 \times A0) + e(0 \times B9) + e(\text{이}))/8.0,$$

Here, e(x) represents the embedding of token x. In other embodiments, in addition to calculating the average embeddings of all subtokens, the element-wise maximum/minimum of the embeddings can also be calculated and utilized.

The vocabulary extension function 303 can operate as shown in FIGS. 4B through 4D to expand the vocabulary of an LLM to support an additional language. Once the vocabulary is expanded, the continued pre-training function 304 may be performed.

Although FIGS. 4A through 4D illustrate one example of an expansion of an existing LLM's vocabulary during extension of the LLM to new languages using the pipeline 300 of FIG. 3, various changes may be made to FIGS. 4A through 4D. For example, the inputs, tokens, and subtokens shown in FIGS. 4A through 4D are examples only and can vary widely based on the text being processed and the language being added to an LLM.

In some embodiments of the continued pre-training function 304, full training and optimization can be performed using a mix/ratio of different language datasets. In the example of extending English to Korean, when extending a well-pretrained English LLM 301 to the Korean language, pre-training may try specified data mix ratios (measured by disk size) as follows.

| English corpus (%) | Korean corpus (%) |
|---|---|
| 90 | 10 |
| 75 | 25 |
| 50 | 50 |

In some cases, the data mix ratio used for pretraining can be optimized based on one or more of the following metrics.

For the Korean language, zero-shot macro F1 scores on Choice of Plausible Alternatives (COPA), HellaSwag, BoolQ, SentiNeg, and Words in Context (WiC) may be used. The scores on those five benchmarks may be averaged as the Korean score.

For the English language, zero-shot accuracy-norm scores on HellaSwag, MathQA, and OpenBookQA may be used, together with an accuracy score on BoolQ. The four benchmark scores may be averaged as the English score.

The average of the Korean score and the English score may be used as the final metric to optimize the multi-lingual extended language model.

The instruction fine-tuning function 306 can be performed on the best pre-trained checkpoint(s), and the instruction tuning data that is utilized may contain different types of data specified as below (where "en" represents English and "ko" represents Korean, and where an input may or may not be utilized).

General instructions data (en and ko):

Instruction: Explain why the following fraction is equivalent to ¼

Input: 4/16

Response: The fraction 4/16 is equivalent to ¼ because both numerators and denominators are divisible by 4. Dividing both the top and bottom numbers by 4 yields the fraction ¼.

Instruction: 세 가지 기본 색은 무엇인가요?

Input:

Response: 기본 색은 빨강, 파랑, 노랑입니다

Conditional denoising on machine translation data:

Instruction: Given the English sentence \"Songdo to host G-20 prep meeting\", complete the following equivalent Korean sentence:

\"WBC 볘녜수엘라, 승리를 [MASK]\".

Input:

Response: 기원합니다

Conditional denoising on instruction data:

Instruction: "Given the Korean text \"{'instruction': '다음 주제와 관 련된 흥미로운 사실을 찾으세요', 'input': '인공지능', 'output': '인공지능은 Google-Sans라는 AI생성 폰트를 디자인하는 데 사용되었습니다'}\", complete the following equivalent English text: \"{'instruction': '[MASK]', 'input': 'Artificial Intelligence', 'output': 'Artificial intelligence has been used to design an AI-created font called GoogleSans.'}""".

Input:

Response: Find an interesting fact related to the following topic.

The two examples above for general instructions data and the examples for conditional denoising machine translation data and conditional denoising instruction data are merely examples. Optionally, for instance, machine translation data may also be utilized, such as in the following manner.

Machine translation parallel data (en->ko and ko->en):

Instruction: Translate the following Korean sentence into English (and vice versa)

Input: 모든 지붕은 지하의 40만 리터 용량의 탱크로 연결되어 있어 어떠한 물도 버려지는 일이 없죠

Response: All the roofs are connected underground to a 400,000 liter tank, and no water is wasted.

With respect to feedback 309 of the multi-lingual LLM 308 as an input to the pipeline 300, extension of the LLM to two or more additional languages can proceed one by one, rather than attempting to extend the LLM to all desired languages at once, which would make it difficult to control the whole process. For example, to extend a well pre-trained English model into multiple languages, the model can be extended sequentially. As a particular example, the data mix ratio can be tuned, and the LLM can be extended to one additional language. After becoming confident that the extended model works, the extended model can again be extended to another language (with tuning of the data mix ratio again). Assuming that the well pre-trained English model is to be extended to both Korean and Chinese, the following procedure may be employed in some cases.

Extend the English model to Korean, with the optimal data mix ratio optimized for Korean and English; and Using the extended model from the preceding step, extend the extended model to Chinese, with optimization of the data mix ratio for Chinese and Korean plus English.

Multi-lingual large language models can be used in many commercial applications or other applications, such as personal assistants, smart home control, customer service, or predictive or functional use cases like keyboard input interpretation, text summarization, sentence autocomplete, and the like. Internal uses for an enterprise may include use as a productivity LLM for employees to help in writing code, auto-writing emails, or answering questions about enterprise processes like finance/travel approval.

Figure 5:
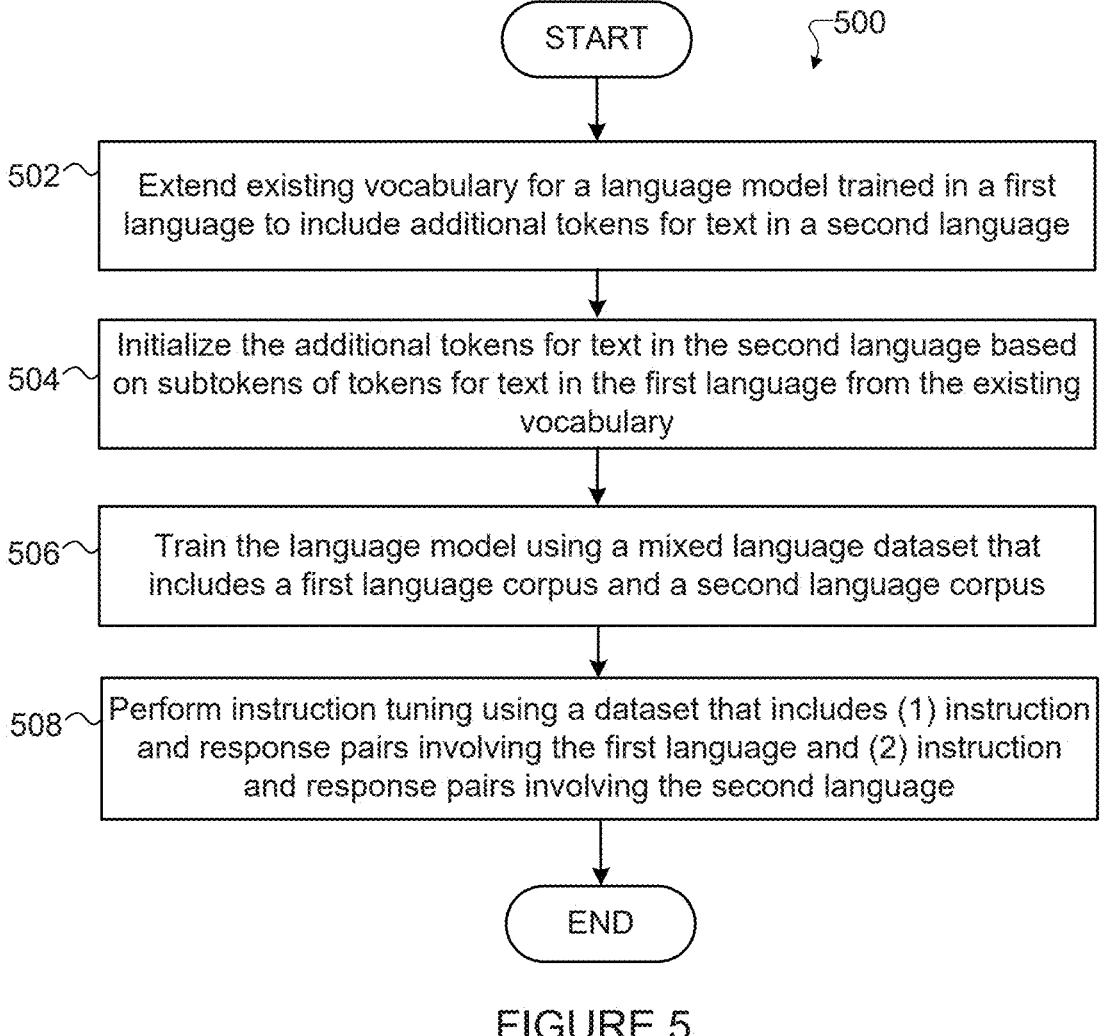
FIG. 5 illustrates an example process for enabling a language model trained in a first language to support a second language in accordance with this disclosure.

FIG. 5 illustrates an example process 500 for enabling a language model trained in a first language to support a second language in accordance with this disclosure. For ease of explanation, the process 500 shown in FIG. 5 is described as being implemented on or supported by one or more components of the network configuration 100 of FIG. 1 described above, such as one or more servers 106. However, this is merely one example, and the process 500 could be implemented on or supported by any other suitable device(s) and in any other suitable system(s).

As shown in FIG. 5, an existing vocabulary for a language model trained in a first language is extended to include additional tokens for text in a second language (step 502). The additional tokens for text in the second language are initialized based on subtokens of tokens for text in the first language from the existing vocabulary (step 504). The language model is trained using a mixed language dataset that includes a first language corpus and a second language corpus (step 506). In some cases, a ratio between the first language corpus and the second language corpus is selected to improve accuracy of the language model in both the first language and the second language. Instruction tuning is performed using a dataset that includes (i) instruction and response pairs involving the first language and (ii) instruction and response pairs involving the second language (step 508). In some cases, the dataset includes (i) general instruction data from the first language and the second language and (ii) additional instruction data to align the first language and the second language, where the additional instruction data includes machine translation parallel data and conditional denoising data. Also, in some cases, a mix of the general instruction data and the additional instruction data is selected to improve performance of the language model in the second language without substantially degrading performance of the language model in the first language.

Note that the process 500 shown here can be repeated any suitable number of times to expand the LLM to any suitable number of languages sequentially. In each subsequent iteration of the process 500, the LLM as previously expanded can be expanded again to support an additional language.

Although FIG. 5 illustrates one example of a process 500 for enabling a language model trained in a first language to support a second language, various changes may be made to FIG. 5. For example, while shown as a series of steps, various steps in FIG. 5 may overlap, occur in parallel, occur in a different order, or occur any number of times (including zero times).

Depending on the implementation, the described techniques may have various benefits or advantages. For example, using the approaches described above, accuracy of a language model in a new language can be significantly improved with little or no drop in performance for one or more existing languages already learned by the language model. The approaches described above also allow for quick and easy multi-lingual extension with low processing and data requirements. This is because a language model that is already well-trained in one language can be leveraged and quickly extended to a new language with relatively low processing and data requirements. In some cases, the extension of a language model to a new language may involve about one percent or less of the processing time and three percent or less of the training data (compared to the processing time and training data used to train the language model with an original language).

The approaches described above further provide for lower latencies in language model response generation for one or more added languages. With the vocabulary extension described above, the number of tokens used to represent and generate text in a new language can be reduced significantly, thus resulting in lower latency response generation in the new language. As a particular example, a Korean-extended LLM model may require a fourth to a third of the tokens needed to represent Korean text compared to an LLM originally trained for the Korean language. In addition, the approaches described above can improve performance and efficiency of data usage by effectively combining the continued pre-training function 304 and the instruction fine-tuning function 306. By combining pretraining and instruction tuning, performance in the new language can be improved with less pretraining data. Finally, adding languages one at a time can simplify model extension. For example, if the LLM is extended to other languages one by one, tuning the parameters according to immediate results can be easier. As a particular example, when adding Chinese capability to a Korean-English model, by tuning the data ratios and parameters during continued pre-training and instruction tuning, the result is a model that is proficient in Korean, English, and Chinese.

Note that the operations and functions shown in or described with respect to FIGS. 2 through 5 can be implemented in one or more electronic devices 101, 102, 104, servers 106, or other device(s) in any suitable manner. For example, in some embodiments, the operations and functions shown in or described with respect to FIGS. 2 through 5 can be implemented or supported using one or more software applications or other software instructions that are executed by the processor(s) 120 of one or more electronic devices 101, 102, 104, servers 106, or other device(s). In other embodiments, at least some of the operations and functions shown in or described with respect to FIGS. 2 through 5 can be implemented or supported using dedicated hardware components. In general, the operations and functions shown in or described with respect to FIGS. 2 through 5 can be performed using any suitable hardware or any suitable combination of hardware and software/firmware instructions. Also, the functions shown in or described with respect to FIGS. 2 through 5 can be performed by a single device or by multiple devices.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method of enabling a language model trained in a first language to support a second language, the method comprising:
   extending an existing vocabulary of the language model that includes existing tokens for text in the first language to include additional tokens for text in the second language;
   initializing the additional tokens for text in the second language based on predefined subtokens of the existing tokens for the text in the first language from the existing vocabulary, where the existing tokens are already known to a tokenizer;
   training the language model using a mixed language dataset that includes a first language corpus and a second language corpus; and
   performing instruction tuning using a dataset that includes (i) instruction and response pairs involving the first language and (ii) instruction and response pairs involving the second language.

2. The method of claim 1, wherein a ratio between the first language corpus and the second language corpus is selected to improve accuracy of the language model in both the first language and the second language.

3. The method of claim 1, further comprising:
   extending the existing vocabulary to include additional tokens for text in a third language; and
   training the language model using an extended mixed language dataset that includes at least a portion of the mixed language dataset and a third language corpus.

4. The method of claim 3, wherein a ratio between the third language corpus and at least the portion of the mixed language dataset is selected to improve accuracy of the language model in the first language, the second language, and the third language.

5. The method of claim 1, wherein the dataset includes (i) general instruction data from the first language and the second language and (ii) additional instruction data to align the first language and the second language, the additional instruction data including machine translation parallel data and conditional denoising data.

6. The method of claim 5, wherein a mix of the general instruction data and the additional instruction data is selected to improve performance of the language model in the second language without degrading performance of the language model in the first language.

7. The method of claim 1, wherein the language model is extended from the first language to the second language and additional languages sequentially.

8. An electronic device comprising:
   at least one processing device configured to:
      extend an existing vocabulary of a language model trained in a first language and including existing tokens for text in the first language to include additional tokens for text in a second language;
      initialize the additional tokens for text in the second language based on predefined subtokens of the existing tokens for the text in the first language from the existing vocabulary, where the existing tokens are already known to a tokenizer;

train the language model using a mixed language dataset that includes a first language corpus and a second language corpus; and perform instruction tuning using a dataset that includes (i) instruction and response pairs involving the first language and (ii) instruction and response pairs involving the second language.

9. The electronic device of claim 8, wherein a ratio between the first language corpus and the second language corpus is selected to improve accuracy of the language model in both the first language and the second language.

10. The electronic device of claim 8, wherein the at least one processing device is further configured to:

extend the existing vocabulary to include additional tokens for text in a third language; and train the language model using an extended mixed language dataset that includes at least a portion of the mixed language dataset and a third language corpus.

11. The electronic device of claim 10, wherein a ratio between the third language corpus and at least the portion of the mixed language dataset is selected to improve accuracy of the language model in the first language, the second language, and the third language.

12. The electronic device of claim 8, wherein the dataset includes (i) general instruction data from the first language and the second language and (ii) additional instruction data to align the first language and the second language, the additional instruction data including machine translation parallel data and conditional denoising data.

13. The electronic device of claim 12, wherein a mix of the general instruction data and the additional instruction data is selected to improve performance of the language model in the second language without degrading performance of the language model in the first language.

14. The electronic device of claim 8, wherein the at least one processing device is configured to extent the language model from the first language to the second language and additional languages sequentially.

15. A non-transitory machine readable medium containing instructions that when executed cause at least one processor of an electronic device to:

extend an existing vocabulary of a language model trained in a first language that includes existing tokens for text in the first language to include additional tokens for text in a second language;

initialize the additional tokens for text in the second language based on predefined subtokens of the existing tokens for the text in the first language from the existing vocabulary, where the existing tokens are already known to a tokenizer;

train the language model using a mixed language dataset that includes a first language corpus and a second language corpus; and perform instruction tuning using a dataset that includes (i) instruction and response pairs involving the first language and (ii) instruction and response pairs involving the second language.

16. The non-transitory machine readable medium of claim 15, wherein a ratio between the first language corpus and the second language corpus is selected to improve accuracy of the language model in both the first language and the second language.

17. The non-transitory machine readable medium of claim 15, further containing instructions that when executed cause the at least one processor to:

extend the existing vocabulary to include additional tokens for text in a third language; and train the language model using an extended mixed language dataset that includes at least a portion of the mixed language dataset and a third language corpus.

18. The non-transitory machine readable medium of claim 17, wherein a ratio between the third language corpus and at least the portion of the mixed language dataset is selected to improve accuracy of the language model in the first language, the second language, and the third language.

19. The non-transitory machine readable medium of claim 15, wherein the dataset includes (i) general instruction data from the first language and the second language and (ii) additional instruction data to align the first language and the second language, the additional instruction data including machine translation parallel data and conditional denoising data.

20. The non-transitory machine readable medium of claim 19, wherein a mix of the general instruction data and the additional instruction data is selected to improve performance of the language model in the second language without degrading performance of the language model in the first language.

* * * * *